(12) United States Patent
Liu et al.

(10) Patent No.: US 8,120,411 B1
(45) Date of Patent: Feb. 21, 2012

(54) CHARGE PUMP WITH RAMP RATE CONTROL

(75) Inventors: Ping-Chen Liu, Fremont, CA (US); Thien Le, San Jose, CA (US)

(73) Assignee: Altera Corporation, San Jose, CA (US)

( * ) Notice: Subject to any disclaimer, the term of this patent is extended or adjusted under 35 U.S.C. 154(b) by 183 days.

(21) Appl. No.: 12/534,007

(22) Filed: Jul. 31, 2009

(51) Int. Cl.
*G05F 1/46* (2006.01)

(52) U.S. Cl. .......................... 327/536; 327/535; 363/59

(58) Field of Classification Search .................. None
See application file for complete search history.

(56) References Cited

U.S. PATENT DOCUMENTS

| | | | |
|---|---|---|---|
| 5,168,174 A * | 12/1992 | Naso et al. ............ | 327/540 |
| 6,157,243 A * | 12/2000 | Tailliet ................ | 327/536 |
| 6,492,862 B2 | 12/2002 | Nakahara | |
| 6,661,683 B2 | 12/2003 | Botker et al. | |
| 6,741,118 B2 * | 5/2004 | Uchikoba et al. ...... | 327/541 |
| 6,794,923 B2 | 9/2004 | Burt et al. | |
| 6,836,176 B2 | 12/2004 | Zeng et al. | |
| 6,937,487 B1 * | 8/2005 | Bron ................... | 363/60 |
| 7,009,241 B2 * | 3/2006 | Marotta ............... | 257/307 |
| 7,253,676 B2 * | 8/2007 | Fukuda et al. ........ | 327/536 |
| 7,348,829 B2 * | 3/2008 | Choy et al. ........... | 327/536 |
| 7,358,778 B2 * | 4/2008 | Kato et al. ............ | 327/77 |
| 7,542,351 B2 * | 6/2009 | Choy et al. ......... | 365/185.25 |
| 7,602,168 B2 * | 10/2009 | Wang et al. ........... | 323/288 |
| 7,602,230 B2 * | 10/2009 | Castaldo et al. ....... | 327/534 |
| 7,663,960 B2 * | 2/2010 | Suzuki et al. ......... | 365/226 |
| 7,724,072 B2 * | 5/2010 | Baek et al. ............ | 327/536 |

* cited by examiner

*Primary Examiner* — Lincoln Donovan
*Assistant Examiner* — Terry L Englund
(74) *Attorney, Agent, or Firm* — Treyz Law Group; G. Victor Treyz; Chih-Yun Wu

(57) ABSTRACT

A charge pump circuit is provided that has a controllable ramp rate. The charge pump circuit may receive a control signal from a control circuit. The control signal may be asserted by the control circuit to turn on the charge pump circuit. When the charge pump circuit is turned on, the charge pump circuit produces an output voltage. The output voltage ramps up from an initial value to a desired target value. During the ramp up process, a ramp rate regulation circuit monitors the output voltage and ensures that the ramp rate does not exceed a desired maximum value. A capacitor may be charged at a desired ramp rate to use as a time-varying reference voltage. A feedback circuit may be used to maintain the output voltage at the desired target value once the ramp-up process is complete.

18 Claims, 6 Drawing Sheets

CHARGE PUMP WITH RAMP RATE CONTROL

BACKGROUND

This invention relates to integrated circuits, and more particularly, to charge pump circuitry for integrated circuits.

Charge pumps are widely used in integrated circuits to generate desired voltages. For example, charge pump circuits may be used to generate power supply voltages. Charge pumps contain multiple stages connected in series. Each stage has an associated capacitor and a switching element such as a diode. When the stages are driven by an oscillator, an output voltage is produced at the output of the charge pump. The charge pump can be turned off by disabling the oscillator.

It is often desirable to provide an integrated circuit with a robust charge pump. A charge pump that is too weak may experience difficulties when a large load current is demanded. If a charge pump is made strong enough, however, the charge pump will be able to satisfactorily operate under a wide variety of load conditions.

Care should be taken, however, to avoid creating problems with an overly strong charge pump. As an example, a strong charge pump may respond too quickly to input control signals. This may cause the output voltage of the charge pump to change so rapidly that circuitry that is being powered by the charge pump output voltage does not operate properly.

It would therefore be desirable to be able to provide improve charge pump circuitry for integrated circuits.

SUMMARY

A charge pump circuit may be provided that has voltage regulation circuitry and ramp rate control circuitry. The voltage regulation circuitry may be used to maintain a target output voltage for the charge pump during operation. The ramp rate control circuitry may be used to establish a maximum allowable ramp rate for the charge pump when the charge pump is turned on.

The voltage regulation circuitry and the ramp rate control circuitry may be implemented using comparator circuits. The voltage regulation circuitry may compare the output voltage to a voltage reference such as a voltage reference produced by a bandgap reference circuit. The ramp rate control circuitry may have a current source and a capacitor. The current source may charge the capacitor to produce a ramping reference voltage. A comparator in the ramp rate control circuitry may compare the ramping reference voltage to the output voltage to produce a corresponding ramp rate control signal. The rate at which the ramping reference voltage increases establishes the maximum permissible ramp rate for the charge pump output voltage.

Further features of the invention, its nature and various advantages will be more apparent from the accompanying drawings and the following detailed description of the preferred embodiments.

DETAILED DESCRIPTION

Charge pump circuits contain series-connected stages of capacitors and diodes or other switching device that are driven by the output of an oscillator. When the oscillator output is inactive, the charge pump circuit will be inactive. When the oscillator is active, the charge pump circuit will be turned on and will produce a charge pump output voltage at an output terminal. The ability to control the charge pump by controlling the oscillator in the charge pump allows the charge pump to be turned on and off as needed. This control capability may also be used to regulate the output voltage that is produced by the charge pump. For example, a feedback circuit can be used to monitor the output voltage and make appropriate corrections by turning on and off the charge pump.

The output of a regulated charge pump may be used as a power supply voltage or may be used in other suitable circuit applications. Arrangements in which the output voltage from a charge pump circuit is used as a power supply voltage for memory circuitry on an integrated circuit are sometimes described herein as an example. These arrangements are, however, merely illustrative. Charge pumps can be used to produce output voltages for any circuitry on an integrated circuit.

Figure 1:
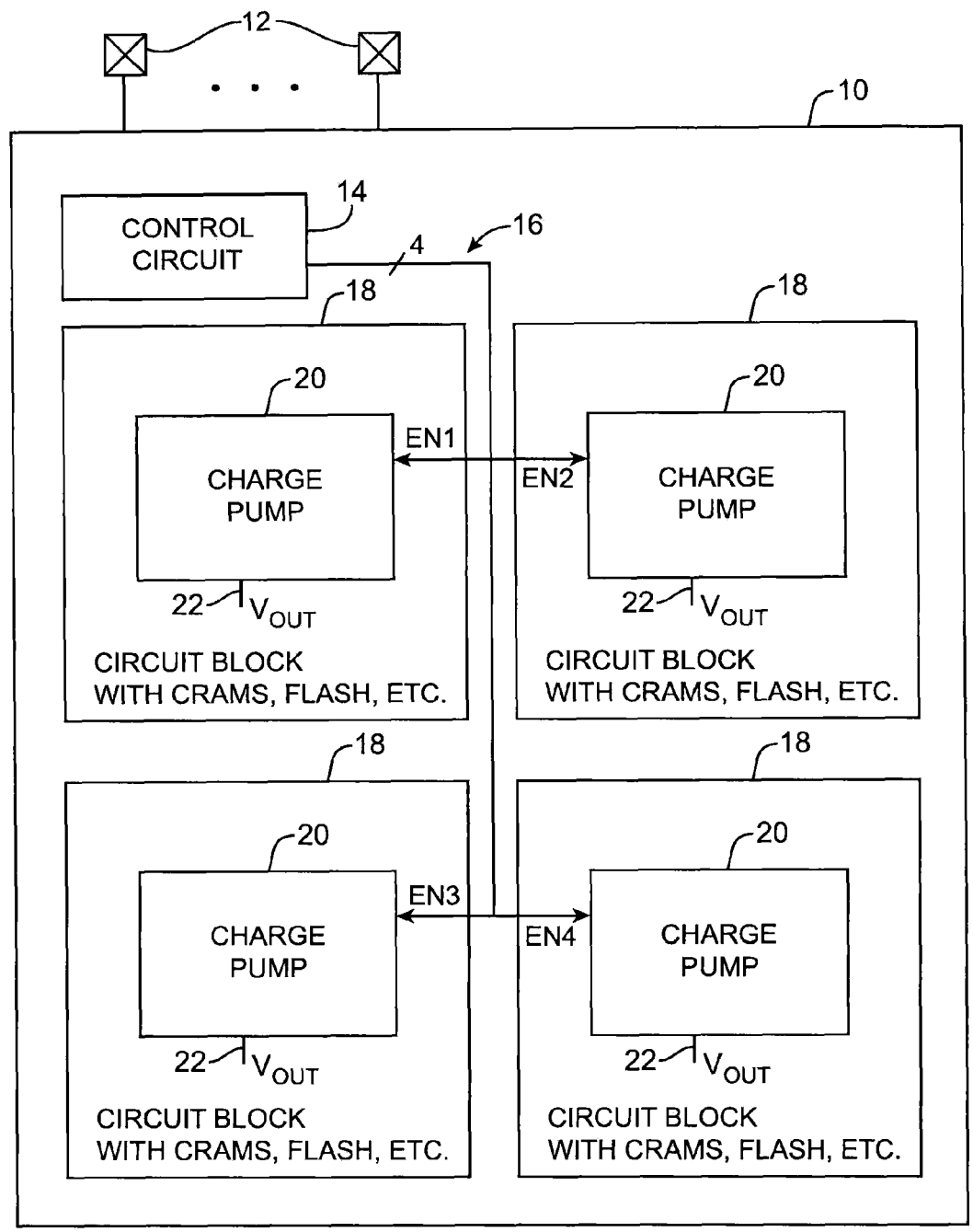
FIG. 1 is a diagram of an integrated circuit with charge pump circuitry in accordance with an embodiment of the present invention.

To prevent excessively fast ramp rates when a charge pump is turned on, a charge pump may be provided with ramp rate control capabilities. An illustrative circuit that may contain charge pump circuitry with ramp rate control capabilities is shown in FIG. 1. As shown in FIG. 1, circuit 10 may receive power and data using input-output pins 12. There may be any suitable number of pins associated with integrated circuit 10. These pins may be used to receive one or more power supply voltages (e.g., a ground power supply voltage Vss, a logic power supply voltage Vcc, an elevated power supply voltage Vcc-elevated, etc.).

There may be a need to generate internal voltages in circuit 10 that differ from these external voltages. For example, it may be desirable to produce negative voltages internally, even when only positive power supply voltages are supplied to circuit 10 via pins 12. As another example, it may be desirable to produce voltages that are larger in magnitude or that are different in magnitude than the power supply voltages received through pins 12. It may also be desirable to produce power supply voltages or other voltages that vary as a function of time. For example, some circuit applications may require production of a positive power supply voltage that has a first value during certain operations and that has a second value during other operations.

Some of these voltage requirements can be satisfied by using additional pins 12 to receive additional power supply voltages. There is a limit, however, to how many pins 12 an integrated circuit can dedicate to power supply functions. If too many pins are used for power supply voltages, there may be an insufficient number of pins available for other input-output functions (e.g., for handling data).

Linear voltage regulator circuits can sometimes be used to generate desired voltage levels from externally supplied voltages. These circuits may not be as efficient as charge pumps and may therefore consume undesirably large amounts of power.

In the illustrative arrangement of FIG. 1 integrated circuit 10 has a control circuit 14 that controls charge pumps 20. Charge pumps 20 may be used to efficiently generate desired output voltages (Vout) on their outputs 22 in response to control signals received from control circuit 14 over path 16. The control signals that are supplied to charge pumps 20 may, for example, be enable signals (ENABLE) that turn on each charge pump 20 when it is desired to produce an output voltage for a corresponding block of circuitry 18 on integrated circuit 10. There are four blocks of circuitry 18 in the example of FIG. 1, but this is merely illustrative. There may, in general, be one block of circuitry, two blocks of circuitry, or three or more blocks of circuitry 18 on a given integrated circuit 10. The FIG. 1 arrangement is merely illustrative.

Each circuit 18 may use the output from its charge pump as a power supply voltage or other input. As an example, each circuit 18 may contain erasable-programmable read-only memory (EPROM), flash memory, random-access memory (RAM), configuration random-access memory (CRAM), or other memory elements that may be powered using the charge pump output voltages. These output voltages may be elevated with respect to other voltages on circuit 10, may be positive, may be negative, or may have any other suitable values.

Figure 2:
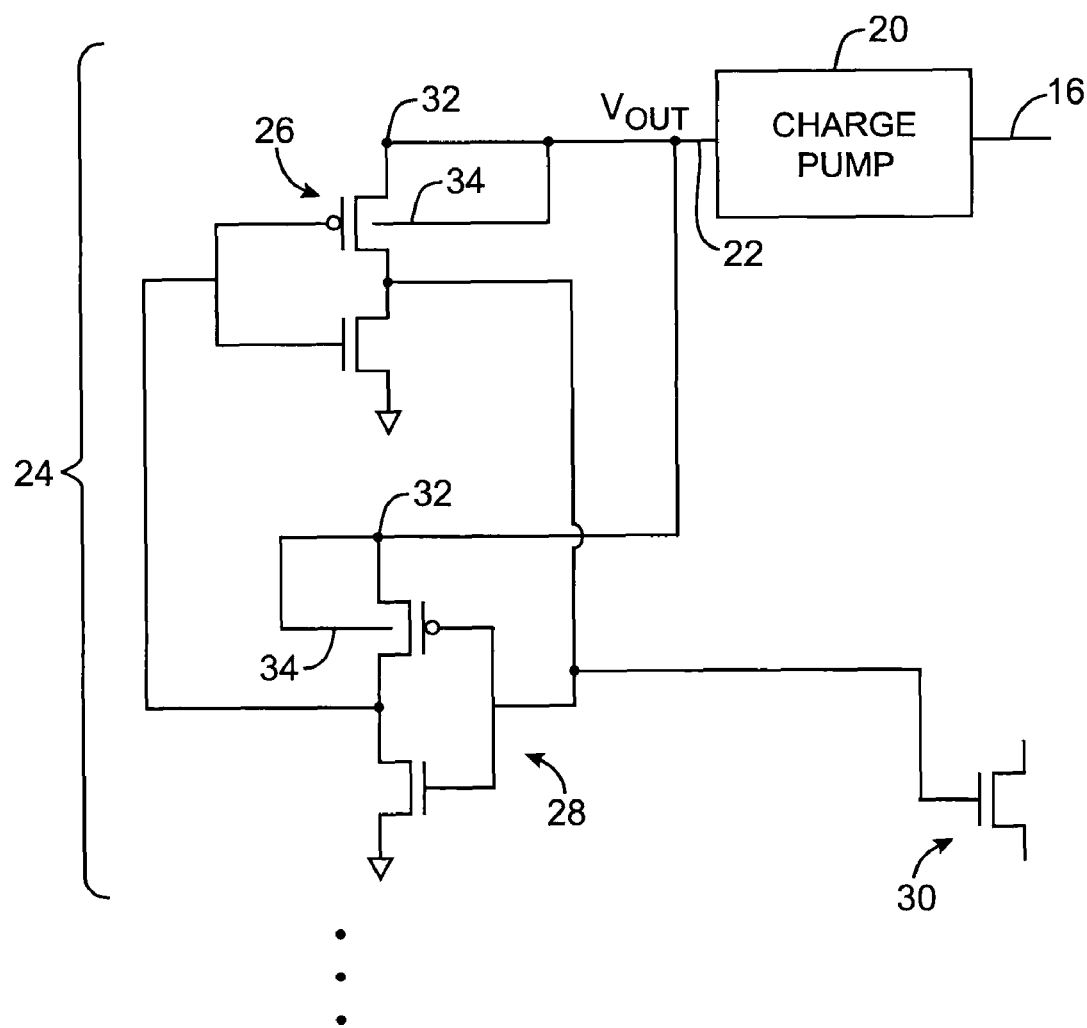
FIG. 2 is a diagram of a charge pump that supplies an output voltage to a memory cell such as a configuration random-access-memory (CRAM) element on a programmable logic device in accordance with an embodiment of the present invention.

An example of a circuit that may use a charge pump output voltage is shown in FIG. 2. In the FIG. 2 example, charge pump 20 is controlled by a control signal on control input 16. The control signal on input 16 may be, for example, an enable signal from control circuit 14 of FIG. 1 and/or local charge pump control circuitry. When the control signal on input 16 is deasserted, charge pump 20 will be turned off. When the control signal on input 16 is asserted, charge pump 20 will be turned on and will produce a power supply voltage Vout on output terminal 22.

The illustrative circuitry that is receiving voltage Vout in the example of FIG. 2 is a random-access memory cell 24. Memory cell 24 may store programming data on a programmable logic device. Programming data is also sometimes referred to as configuration data, so memory cells such as memory cell 24 that store programming data are sometimes referred to as configuration random-access memory (CRAM) cells. CRAM cells produce static output control signals that may be used to configure associated programmable logic on a programmable logic device integrated circuit. In the example of FIG. 2, configuration random-access-memory cell 24 produces a static output control signal that is applied to the gate of programmable logic transistor 30. If the static control signal on the gate of transistor 30 is high, transistor 30 will be turned on. If the static control signal on the gate of transistor 30 is low, transistor 30 will be turned off. An integrated circuit such as a programmable logic device integrated circuit or other circuit that contains programmable logic may contain an array of hundreds, thousands, or millions of CRAM cells such as CRAM cell 24 of FIG. 2, each of which may produce a corresponding static control signal that adjusts the state of a corresponding programmable logic component such as transistor 30 of FIG. 2.

As shown in FIG. 2, CRAM cell 24 may contain cross-coupled inverters 26 and 28. Charge pump output voltage Vout may be supplied to the positive power supply terminals 32 of inverters 26 and 28. Charge pump output voltage Vout may also be supplied to the body bias terminals 34 of the p-channel metal-oxide-semiconductor (PMOS) transistors in inverters 26 and 28. Although terminals 32 and 34 are nominally at the same voltage, differences on these nodes can arise if the ramp rate for Vout is too high. In particular, if the voltage Vout from charge pump 20 increases too rapidly when the control signal on control input 16 turns on charge pump 20, it may be possible for the n-type well regions that are connected to body bias terminals 34 to charge up more slowly than positive power supply terminals 32. This can lead to an undesirable latch-up condition.

To avoid latch-up in circuits such as the illustrative circuit of FIG. 2 and to more accurately control the rate at which voltage Vout ramps up when charge pump 20 is turned on, charge pump 20 may be provided with a ramp-rate control capability.

Figure 3:
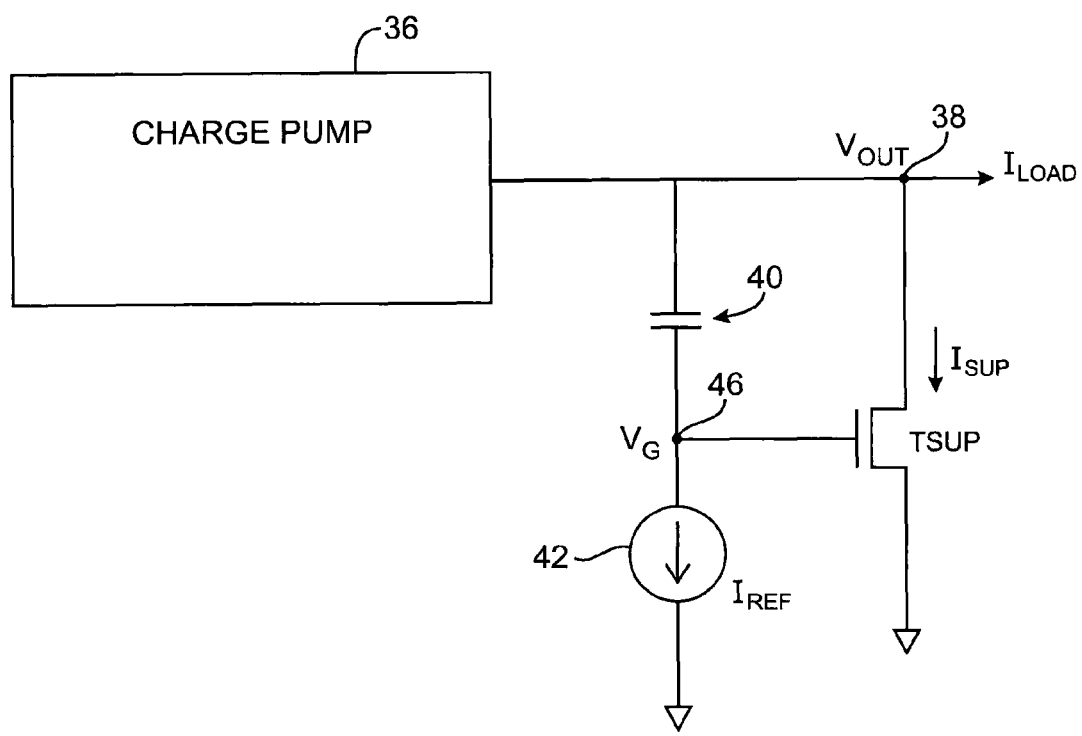
FIG. 3 is a diagram of a conventional charge pump.

A conventional charge pump ramp-rate control circuit is shown in FIG. 3. When turned on, charge pump 36 produces charge pump output voltage Vout on charge pump output terminal 38. A small load current (Iload) is drawn from terminal 38, as shown in FIG. 3.

The arrangement of FIG. 3 serves to limit the ramp rate of Vout. The voltage across capacitor 40 changes slowly, so any sudden increases in Vout will result in a correspondingly sudden increase in Vg on node 46. The sudden increase in Vg will cause transistor TSUP to turn on and will therefore produce a correspondingly sudden increase in current Isup that pulls down Vout and prevents Vout from rising too quickly. After sufficient time has passed following a sudden increase, capacitor 40 will be discharged though current source 42 and will be ready to handle another sudden increase.

Conventional arrangements of the type shown in FIG. 3 have limited applicability. For example, circuits of the type shown in FIG. 3 are not well suited to situations in which the load current Iload is significant (e.g., when handling many body biases in a CRAM array as described in connection with the example of FIG. 2). If Iload is significant, transistor TSUP would need to be increased significantly in size, leading to undesirable increases in power consumption.

Figure 4:
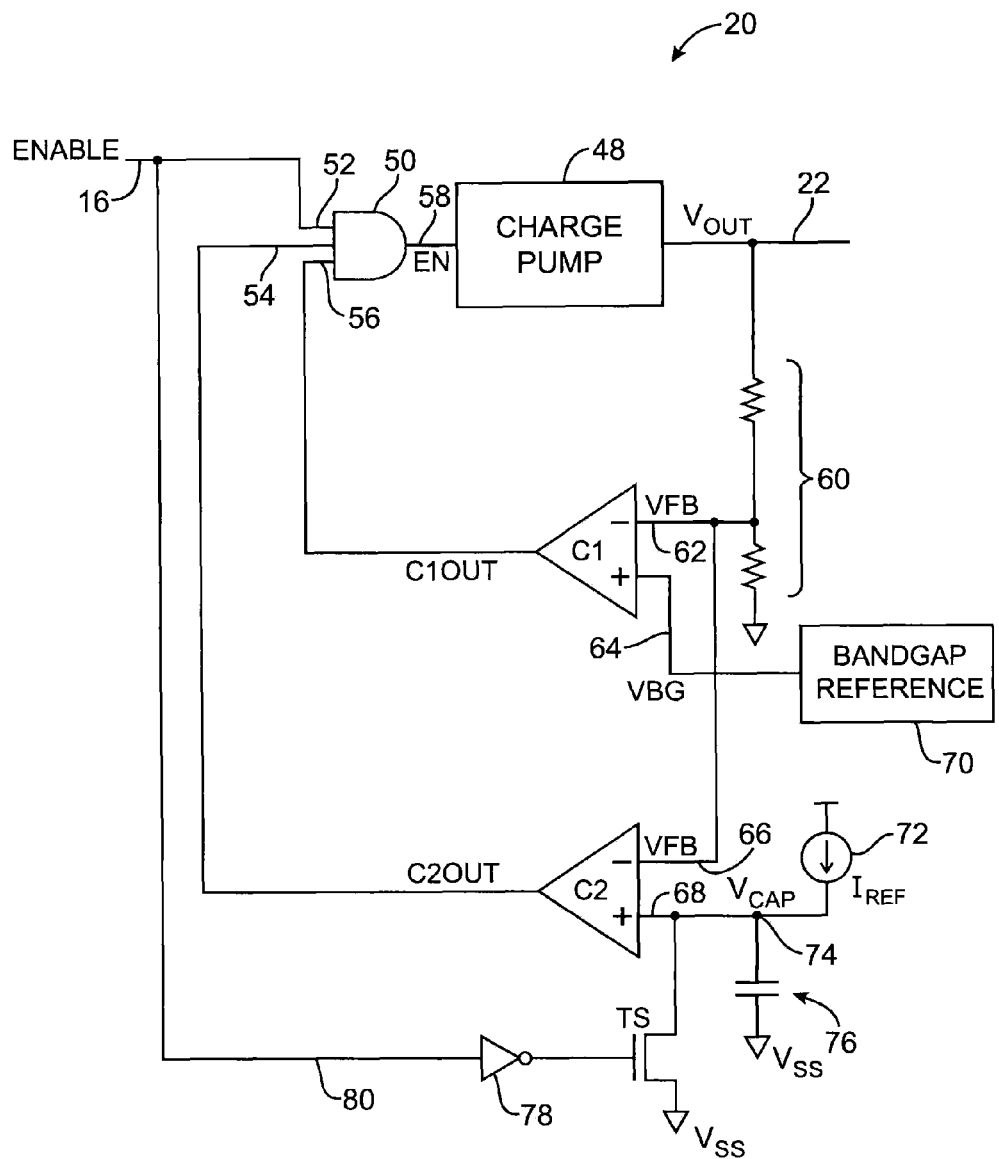
FIG. 4 is a diagram of a charge pump with ramp rate control capabilities in accordance with an embodiment of the present invention.

An illustrative charge pump circuit 20 with ramp rate control capabilities in accordance with an embodiment of the present invention is shown in FIG. 4. As shown in FIG. 4, charge pump circuit 20 may have a charge pump 48. Charge pump 48 may have any suitable number of stages. An oscillator in charge pump 48 may be controlled by enable signal EN at input 58. When signal EN is high, charge pump 48 will be turned on and will produce a voltage Vout for charge pump circuit output terminal 22. When signal EN is low, charge pump 48 will be turned off.

Control circuitry such as control circuit 14 of FIG. 1 may supply an enable signal ENABLE to input 16. Local feedback may be used to regulate the level of Vout and may be used to impose desired ramp rate limits. A logic gate such as AND gate 50 may be used to produce charge pump control signal EN based on control signals received at inputs 52, 54, and 56. In general, any type of logic gate may be used (e.g., a NAND gate, a NOR gate, an OR gate, etc.). The use of an AND gate to implement logic gate 50 is merely illustrative.

The AND gate 50 may receive enable signal ENABLE from line 16 at input 52. Input 56 may be used to receive control signal C1OUT from the output of comparator C1. Input 54 may be used to receive control signal C2OUT from the output of comparator C2. When ENABLE, C1OUT, and C2OUT are all high, the output signal EN at the output of AND gate 50 will be high and charge pump 48 will be enabled. When any or all of the inputs to AND gate 50 are low, output signal EN will be taken low and charge pump 48 will be disabled.

Comparator C1 may form part of a charge pump voltage regulator circuit that helps maintain the output Vout at a target voltage level during normal operation. Comparator C2 may form part of a ramp rate control circuit that imposes a maximum allowable ramp rate on charge pump 20.

Consider, as an example, the situation in which the ENABLE signal on line 16 is low. In this situation, the output of inverter 78 will be high, turning on transistor TS. When transistor TS is on, node 74 is held at ground voltage Vss (e.g., 0 volts). Because ENABLE at input 52 of AND gate 50 is low, signal EN is low, charge pump 48 is off, and Vout is low. Voltage divider circuit 60 feeds back a scaled version of Vout (called VFB) to the negative inputs of comparators C1 and C2 (inputs 62 and 66, respectively).

Bandgap reference 70 produces a reference voltage VBG (e.g., 1.0 volts) at its output, which is received at input 64 of comparator C1. Comparator C1 compares the fed back version of Vout (i.e., VFB on input 62) to voltage reference VBG. During normal operation (e.g., when circuit 20 is active), comparator C1 will take C1OUT high, so long as Vout does not exceed its desired target voltage. When Vout exceeds its target voltage, VFB will rise above VBG and C1OUT will be taken low. This low value will cause EN to go low, regardless of the values of ENABLE and C2OUT, thereby turning off charge pump 48. When Vout no longer exceeds its target voltage, VFB will fall below VBG and C1OUT will be taken high to allow charge pump 48 to operate again. Comparator C1 therefore forms part of a voltage regulation feedback circuit for charge pump circuit 20. If the voltage Vout deviates too much from its desired level, comparator C1 will issue a corrective control signal.

Comparator C2 is used to impose ramp rate control on circuit 20. Capacitor 76 is charged by current source 72 (e.g., at a charge current of Iref). Current Iref can be fixed or the magnitude of Iref may be controlled by CRAM bits loaded into CRAM elements on a programmable integrated circuit (e.g., elements such as memory element 24 of FIG. 2). The magnitude of Iref may also be controlled by dynamic control signals produced by control circuit 14 of FIG. 1 (as an example). If Iref is set to a relatively high value, capacitor 76 will charge quickly (allowing the ramp rate of circuit 20 to be relatively high). If Iref is set to a relatively low value, capacitor 76 will charge more slowly (setting a lower ramp rate for circuit 20). Scenarios in which the magnitude of Iref is fixed are sometimes described herein as an example.

The voltage across capacitor 76 is Vcap. Voltage Vcap is used as a ramping reference voltage. Comparator C2 receives ramping voltage Vcap at input 68 and compares this voltage to the fed back version of Vout (i.e., voltage VFB at input 66). By comparing Vout to the ramped reference Vcap in this way, comparator C2 can determine whether or not voltage Vout is ramping up too quickly. If, at any given time during the ramp up process, VFB exceeds Vcap, comparator C2 will take control signal C2OUT low. This will force signal EN to go low at the control input to charge pump 48, turning off charge pump 48. Once Vcap has risen sufficiently to catch up to Vout, comparator C2OUT will take output signal C2OUT high, enabling charge pump 48.

In a typical turn on process, signal ENABLE is taken high. This turns off transistor TS and allows current source 72 to begin ramping up voltage Vcap on capacitor 76. Initially, voltage Vout is lower than its intended target value (i.e., the target value set by the components of voltage divider 60 and bandgap reference voltage VBG), so charge pump 48 is on. If the output voltage Vout rises faster than ramping voltage reference Vcap, comparator C2 will take signal C2OUT low to temporarily disable charge pump 48. Comparator C2 will take signal C2OUT high to re-enable charge pump 48 once Vcap exceeds Vout. After the output Vout has reached its intended target level, comparator C1 will take signal C1OUT low to prevent further increases in Vout. Thereafter, C1OUT may be toggled on and off as needed to maintain Vout at its target level. Comparator C1 will therefore serve as a voltage regulator comparator for charge pump 20 until charge pump 20 is turned off by taking ENABLE low at input 16.

Figure 5:
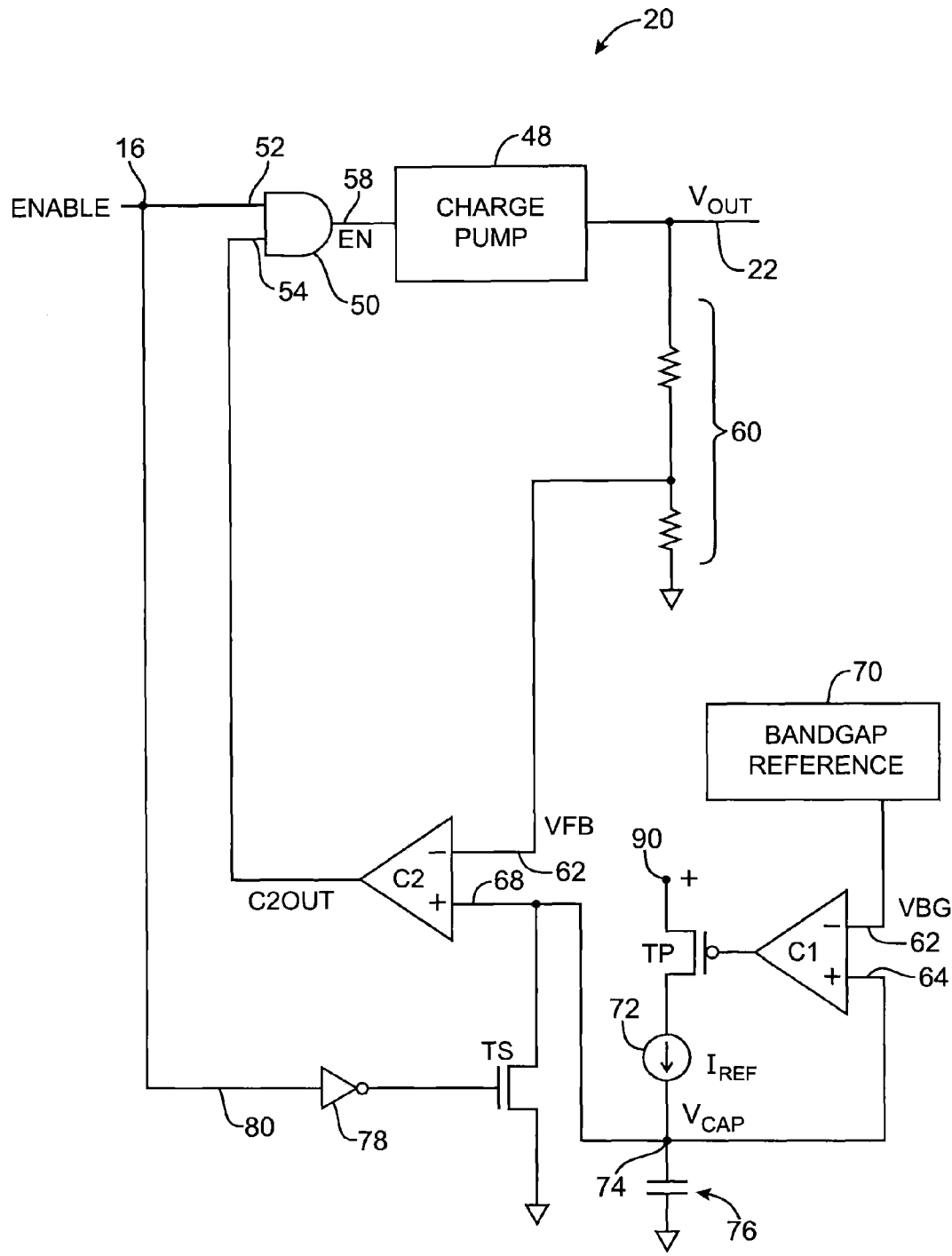
FIG. 5 is a diagram of another charge pump with ramp rate control capabilities in accordance with an embodiment of the present invention.

Another illustrative charge pump circuit with ramp rate control circuitry is shown in FIG. 5. As with the arrangement of FIG. 4, charge pump circuit 20 of FIG. 5 has a comparator C2 that produces a control signal C2OUT that is received at input 54 to AND gate 50. Comparator C2 compares the feedback voltage VFB on input 62 to the voltage Vcap on input 68. Voltage VFB is a scaled version of voltage Vout and therefore represents a measured value of Vout. As with circuit 20 of FIG. 4, voltage Vcap in FIG. 5 serves as a ramping reference voltage. In particular, current source 72 produces a current Iref that controls the charging of capacitor 76 to produce capacitor voltage Vcap. If VFB rises faster than the ramp rate of Vcap, comparator C2 will take output C2OUT low, thereby turning off charge pump 48 and preventing an excessive ramp rate in voltage Vout.

Comparator C1 in the FIG. 5 circuit is used to limit the maximum value that Vcap can attain. Comparator C1 receives reference voltage VBG at input 62 and compares this voltage to voltage Vcap at input 64. If Vcap rises more than the fixed value of VBG, comparator C1 will take its output high, turning off p-channel metal-oxide-semiconductor transistor TP and preventing current flow from positive power supply terminal 90 to current source 72. This prevents current source 72 from delivering more current to capacitor 76. The maximum capacitor voltage Vcap that is established in this way serves to establish the target voltage level for charge pump output voltage Vout. Comparator C1 therefore forms part of the voltage regulation circuit for charge pump 20 of FIG. 5. Comparator C2 serves to impose ramp rate control and, by assisting comparator C1 in imposing the maximum limit on Vcap, also provides voltage regulation functions.

Figure 6:
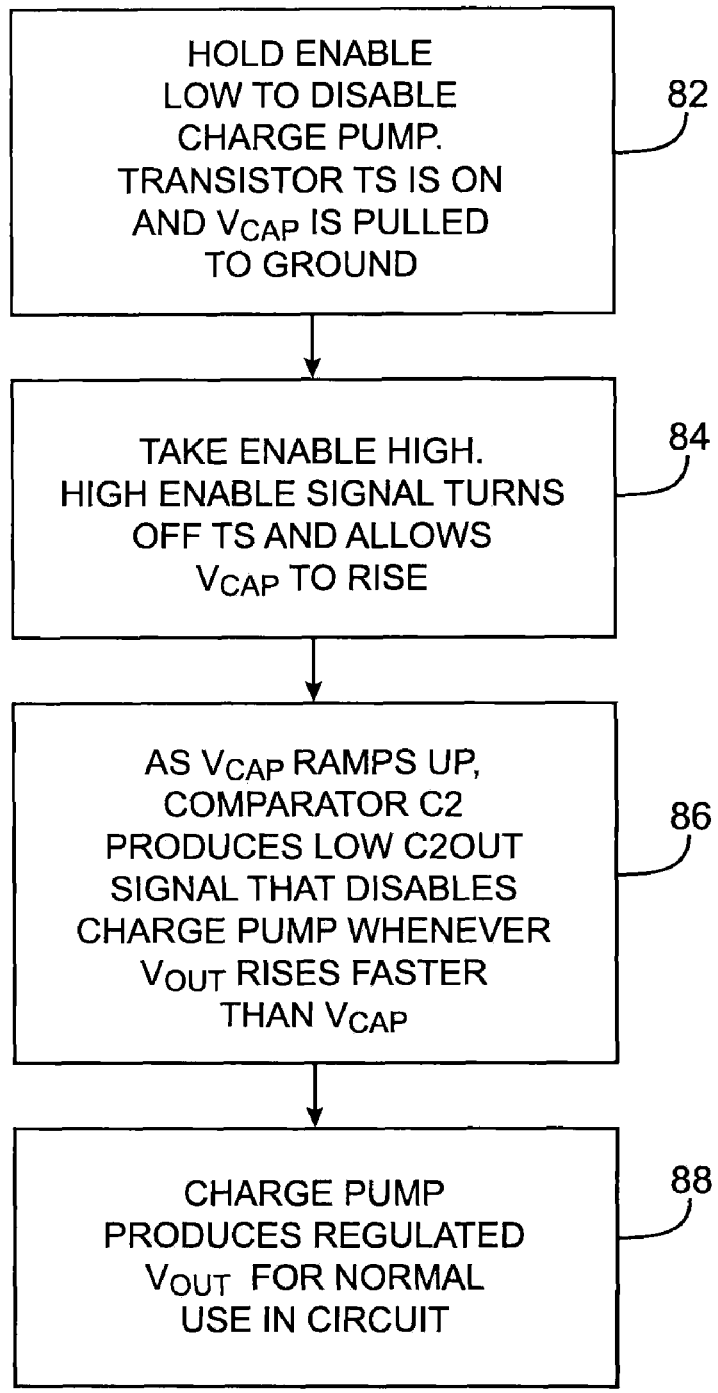
FIG. 6 is a flow chart of illustrative steps involved in operating a charge pump circuit with ramp rate control capabilities in accordance with an embodiment of the present invention.

Illustrative steps involved in operating charge pump circuits with ramp rate control capabilities such as charge pump circuits 20 of FIGS. 4 and 5 are shown in FIG. 6.

At step 82, control circuit 14 may hold the enable signal ENABLE at a logic low level to disable charge pump 20. With ENABLE low, transistor TS is turned on, which discharges ramp rate voltage capacitor 76 and prepares circuit 20 for being enabled with a controlled ramp rate.

At step 84, control circuit 14 may assert the ENABLE signal on line 16. This takes the ENABLE input to AND gate 50 to a high value and allows charge pump 48 to operate under the control of the voltage regulation and ramp rate control circuits. When ENABLE goes high, transistor TS is turned off, so current source 72 can begin to charge capacitor 74 to produce the time-varying ramp rate voltage reference Vcap.

Charge pump 48 is turned on, so long as its input EN remains high. As illustrated by step 86, comparator C2 produces a low C2OUT signal whenever comparator C2 determines that the charge pump output voltage VOUT has risen faster than acceptable.

Charge pump circuit 20 is operated normally in an integrated circuit during step 88. In the scheme of FIG. 4, comparator C1 takes over voltage regulation functions once the initial voltage output ramp up operation is complete. In the scheme of FIG. 5, comparator C1 controls transistor TP so that the magnitude of Vcap is set to an appropriate level to establish the target value of Vout.

The foregoing is merely illustrative of the principles of this invention and various modifications can be made by those skilled in the art without departing from the scope and spirit of the invention.

What is claimed is:

1. A charge pump circuit operable to produce an output voltage that exhibits a voltage output ramp rate when initially turned on, comprising:
   a charge pump having an enable input and a charge pump output, wherein the charge pump produces the output voltage that exhibits the voltage output ramp rate on the charge pump output when an enable signal is asserted on the enable input;
   a feedback circuit that selectively deasserts the enable signal to control the voltage output ramp rate; and
   a comparator that has first and second inputs, wherein the first input receives a voltage based on the output voltage, and wherein the second input receives a capacitor voltage.

2. The charge pump circuit defined in claim 1 further comprising a logic gate that receives a control signal from the comparator.

3. The charge pump circuit defined in claim 1 further comprising a current source that charges a capacitor that provides the capacitor voltage.

4. The charge pump circuit defined in claim 3 further comprising a transistor that controls current flow through the current source.

5. The charge pump circuit defined in claim 4 further comprising an additional comparator that supplies a transistor control signal to the transistor.

6. The charge pump circuit defined in claim 1 further comprising an additional comparator that generates a first control signal based on a reference voltage and the output voltage, wherein the comparator generates a second control signal based on the capacitor voltage and the output voltage.

7. The charge pump circuit defined in claim 6 further comprising a logic gate that receives the first and second control signals and produces the enable signal in response to receiving the first and second control signals.

8. The charge pump circuit defined in claim 7 further comprising:
   a capacitor that produces the capacitor voltage; and
   a current source that charges the capacitor at a ramp rate that establishes a maximum for the voltage output ramp rate.

9. The charge pump circuit defined in claim 1 further comprising:
   a voltage reference that produces a reference voltage;
   an additional comparator that receives the reference voltage and the capacitor voltage; and
   a capacitor that produces the capacitor voltage, wherein the capacitor voltage comprises a time-varying capacitor voltage that increases as the capacitor is charged.

10. The charge pump circuit defined in claim 1 wherein the charge pump output is connected to a body bias terminal in a metal-oxide-semiconductor transistor.

11. The charge pump circuit defined in claim 10 wherein the metal-oxide-semiconductor transistor is contained within a configuration random-access-memory element on a programmable logic device integrated circuit.

12. A charge pump circuit operable to produce an output voltage that exhibits a voltage output ramp rate when initially turned on, comprising:
   a charge pump having an enable input and a charge pump output, wherein the charge pump produces the output voltage that exhibits a voltage output ramp rate on the charge pump output when an enable signal is asserted on the enable input;
   a feedback circuit that selectively deasserts the enable signal to control the voltage output ramp rate;
   a voltage reference that produces a reference voltage;
   a capacitor that has a time-varying capacitor voltage that increases as the capacitor is charged;
   a first comparator that receives the reference voltage and the time-varying capacitor voltage;
   a second comparator that receives the time-varying capacitor voltage; and
   a logic gate having a first input that receives a control signal, a second input that receives a first output signal from the first comparator, and a third input that receives a second output signal from the second comparator.

13. The charge pump circuit defined in claim 12 wherein the logic gate has an output that supplies the enable signal for the charge pump.

14. The charge pump circuit defined in claim 13 wherein the logic gate comprises an AND gate.

15. A method for controlling a ramp rate associated with an output voltage produced by a charge pump, comprising:
   with a circuit, obtaining a first signal that is representative of the output voltage produced by the charge pump;
   with a capacitor, generating a time-varying second signal;
   with a comparator, producing a control signal by comparing the first signal and the time-varying second signal; and
   controlling the ramp rate with the control signal when the charge pump is initially turned on, wherein the ramp rate is based on the time-varying second signal.

16. The method defined in claim 15 further comprising:
   with an additional comparator, maintaining the output voltage at a desired target level using feedback.

17. The method defined in claim 15 wherein generating the time-varying second signal comprises using a current source to charge the capacitor at a desired reference ramp rate.

18. A charge pump circuit, comprising:
   a charge pump that has an output at which the charge pump produces an output voltage;
   a voltage regulation circuit that maintains the output voltage at a desired voltage level using feedback;
   a ramp rate regulation circuit that ensures that the output voltage produced by the charge pump ramps up at a rate less than a desired maximum ramp rate when the charge pump is initially turned on, wherein the ramp rate regulation circuit comprises:
      a comparator that receives a capacitor voltage from a capacitor that is charged by a current source;
      a transistor that controls current flow through the current source; and
      an additional comparator that supplies a transistor control signal to the transistor.

* * * * *